United States Patent [19]

Schmoyer

[11] 3,808,705
[45] May 7, 1974

[54] INSTRUCTIONAL APPARATUS FOR DISPLAYING A CHANGEABLE STILL SEQUENCE AND INCREMENTALLY ADVANCING A PATTERN THEREON

[76] Inventor: Arthur Robert Schmoyer, 11708 River Rd., Potomac, Md. 20854

[22] Filed: Oct. 29, 1971

[21] Appl. No.: 193,938

[52] U.S. Cl. .......................... 35/6, 35/9 A, 116/116
[51] Int. Cl. ........................................... G09b 13/02
[58] Field of Search ............. 35/5, 6, 8 R, 8 A, 8 B, 35/9 R, 9 A, 9 B, 31 R, 31 C, 35 B, 35 C, 48 R, 24 B; 84/478; 116/116

[56] References Cited
UNITED STATES PATENTS

| | | | |
|---|---|---|---|
| 3,508,349 | 4/1970 | Gilden et al. ..................... | 35/9 B X |
| 3,666,872 | 5/1972 | Powell et al. ..................... | 35/9 A |
| 3,436,015 | 4/1969 | Bradford ......................... | 35/24 B X |
| 3,726,250 | 4/1973 | Merk ............................. | 116/116 X |
| 3,125,985 | 3/1964 | Nallinger ........................ | 116/116 |
| 3,414,985 | 12/1968 | Ashley .......................... | 35/6 X |
| 3,460,270 | 8/1969 | Butz et al. ...................... | 35/8 R |
| 3,584,398 | 6/1971 | Meyer et al. ..................... | 35/6 X |
| 3,395,464 | 8/1968 | Leslie et al. .................... | 35/9 A |
| 3,346,968 | 10/1967 | Dellinger ........................ | 35/6 |
| 3,281,959 | 11/1966 | Kobler et al. .................... | 35/9 R X |

Primary Examiner—Wm. H. Grieb
Assistant Examiner—Vance Y. Hum
Attorney, Agent, or Firm—Gardiner, Sixbey, Bradford and Carlson

[57] ABSTRACT

A method and apparatus for teaching a sequence of responses, such as typing, utilizes a device for displaying to a student a changeable still sequence comprising a multiplicity of characters sometimes divided into groups and subgroups, and for incrementally advancing a pattern thereon which serves to sequentially emphasize the characters. The emphasis of each character is retained until the end of a subgroup, group or sequence, at which time the emphasis is removed and when at the end of sequence, a new sequence of characters is displayed and the cycle repeated. The display device may be used in the production of "animated" motion pictures or video recordings.

10 Claims, 8 Drawing Figures

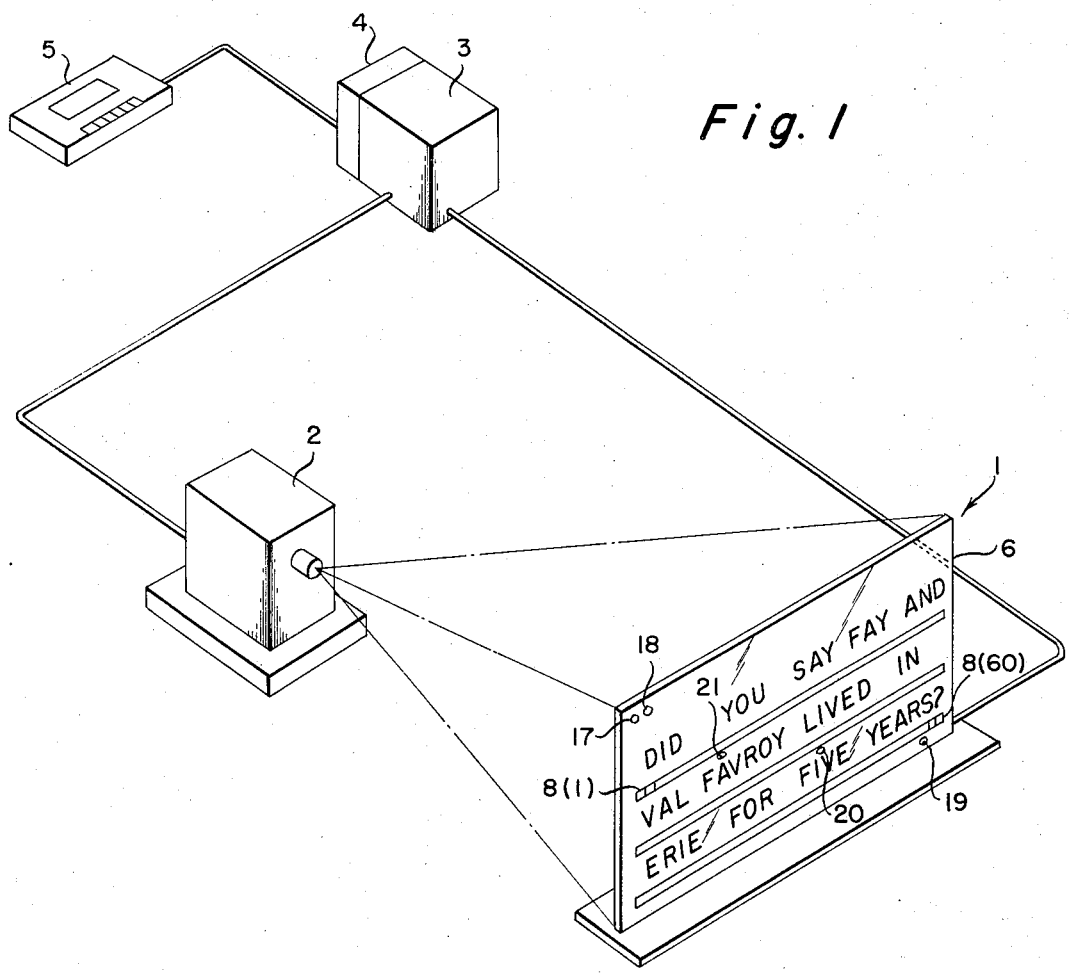
Fig. 1
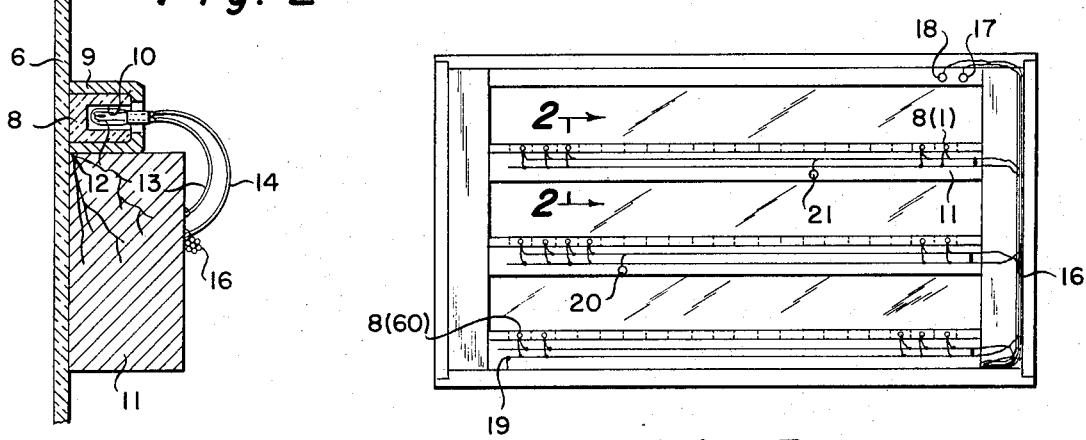
Fig. 2
Fig. 3

INSTRUCTIONAL APPARATUS FOR DISPLAYING A CHANGEABLE STILL SEQUENCE AND INCREMENTALLY ADVANCING A PATTERN THEREON

ENVIRONMENT OF INVENTION

This invention relates generally to the field of audio-visual teaching, and is particularly applicable to the teaching of subjects requiring a sequential performance of a number of operations including identifiable groups of such operations. Even more particularly and in its preferred usage, these identifiable groups comprise words to be typed, but the invention also finds application in operation of other keyboards such as keypunch machines or musical instruments or in operations other than keyboard which may involve sequences of identifiable groups. As an example of the latter, the apparatus is used in the production of "animated" motion pictures or video recordings.

BACKGROUND OF INVENTION — PRIOR ART

Numerous methods and apparatus have been suggested wherein a prerecorded program of audio instructions and cueing signals is effective to snychronize operation of audible reproduction equipment and visible displays for purposes of instruction in the operation of a keyboard operated instrument, such as a typewriter. One such apparatus is disclosed in my Pat. No. 3,377,716 issued Apr. 16, 1968, another is the subject of application Ser. No. 80,354, filed Oct. 13, 1970 by John E. E. Boswell, Jr., and Jesse H. Miner, and still another is the subject of my application Ser. No. 151,729, filed June 10, 1971 now Pat. No. 3,724,097.

In each of the aforementioned disclosures, the activatable portion of the visual display is activated as a stimulus occurring at the instant that response is solicited and is deactivated at the time that the next response is solicited, i.e., upon activation of another stimulus on the display. A student following such a display must maintain sufficient speed in his response to keep up with the display, or a stimulus will be lost. Similarly, the student cannot act in advance of the stimulus inasmuch as he has no indication of what response is next in sequence until either the audio or visual stimulus is actually presented to him. Consequently, a student is precluded from any deviation from the speed of the teaching device. If he falls behind even momentarily, he must skip portions of the solicited response in order to bring his actual response back into synchronism with the device, thus committing errors of omission in his performance. Similarly, if he reaches a point where his ability admits of more rapid response than that of the teaching device, he cannot do so because he must wait for the indication of what that response is to be.

Moreover, inasmuch as student typists vary in their individual abilities to type certain letters or combinations of letters, use certain fingers or manipulate certain portions of a keyboard, they experience a fluctuating rate of speed which involves momentary deviations both above and below an average rate. These deviations become more pronounced as the student attempts to increase his speed of performance. As the deviations become more pronounced, the need for rigid compliance to the preprogrammed rate of occurrence of each individual stimulus becomes a point of anguish and annoyance to the student, and hence is detrimental to the effectiveness of the teaching method.

Other devices for use in conjunction with the teaching of typing comprise automatic pacers which serve to display copy to be typed and to advance an indicator over the copy at a prescribed constant speed. Such a device is illustrated by Strong et al. Pat. No. 3,126,648 issued Mar. 31, 1964. Inasmuch as the copy is visible both ahead of and behind the indicator position, the student may deviate from the prescribed speed. However, such devices suffer from the disadvantage that the prescribed speed remains constant throughout the copy despite the fact that the nature of the copy might dictate variations in speed in different portions thereof. For instance, a typist learns to type the word "the" faster than he might type some other combination of three characters. Hence, when the word "the" is presented as a stimulus, the three characters thereof should be presented at a faster rate than preceding or succeeding characters in order to minimize the disparity between response rate and stimulus rate. This desiderata is recognized in the aforementioned Pat. No. 3,126,648, but no solution is suggested other than the aforementioned provision for permitting deviation between response and stimulus.

OBJECTS OF INVENTION

The teaching systems of the aforedescribed prior art suffer from either or both of two deficiencies, namely they fail to present the visible stimulus in a sequence including time variations determined by the nature and relationship of the characters comprising the individual stimuli, and many of them fail to provide for the student's deviation from the prescribed rate of presentation of stimuli. In contradistinction to the above, this invention has as its principal object the provision of a method and apparatus which accomplishes the foregoing and in which:

1. a substantial sequence of groups of characters is displayed in a manner to be visible in its entirety to the student,
2. means are activated for progressively emphasizing individual characters within successive groups throughout the sequence,
3. the speed of such activation is varied in accordance with the nature and relationship of individual characters,
4. the activation of emphasizing means located at spaces between groups is inhibited,
5. an alternative mode of operation provides for progressive emphasis of entire groups (e.g. words) throughout the sequence,
6. still another alternative mode of operation provides for progressive emphasis of subgroups (e.g., syllables) within a group (e.g., word),
7. means are provided for retaining the emphasis until the end of a group or until the end of a sequence,
8. the apparatus may be used in the production of animated motion pictures or video recordings.

DESCRIPTION OF DRAWINGS

These and other self-evident advantages will be better understood by a consideration of the ensuing specification and accompanying drawings, in which:

FIG. 1 is a diagrammatic view in perspective of one aspect of the invention,

FIG. 2 is a cross section in elevation of a portion of the display panel of FIG. 1, FIG. 3 is a rear view of the display panel.

DESCRIPTION OF THE DISPLAY PANEL

Figure 4:
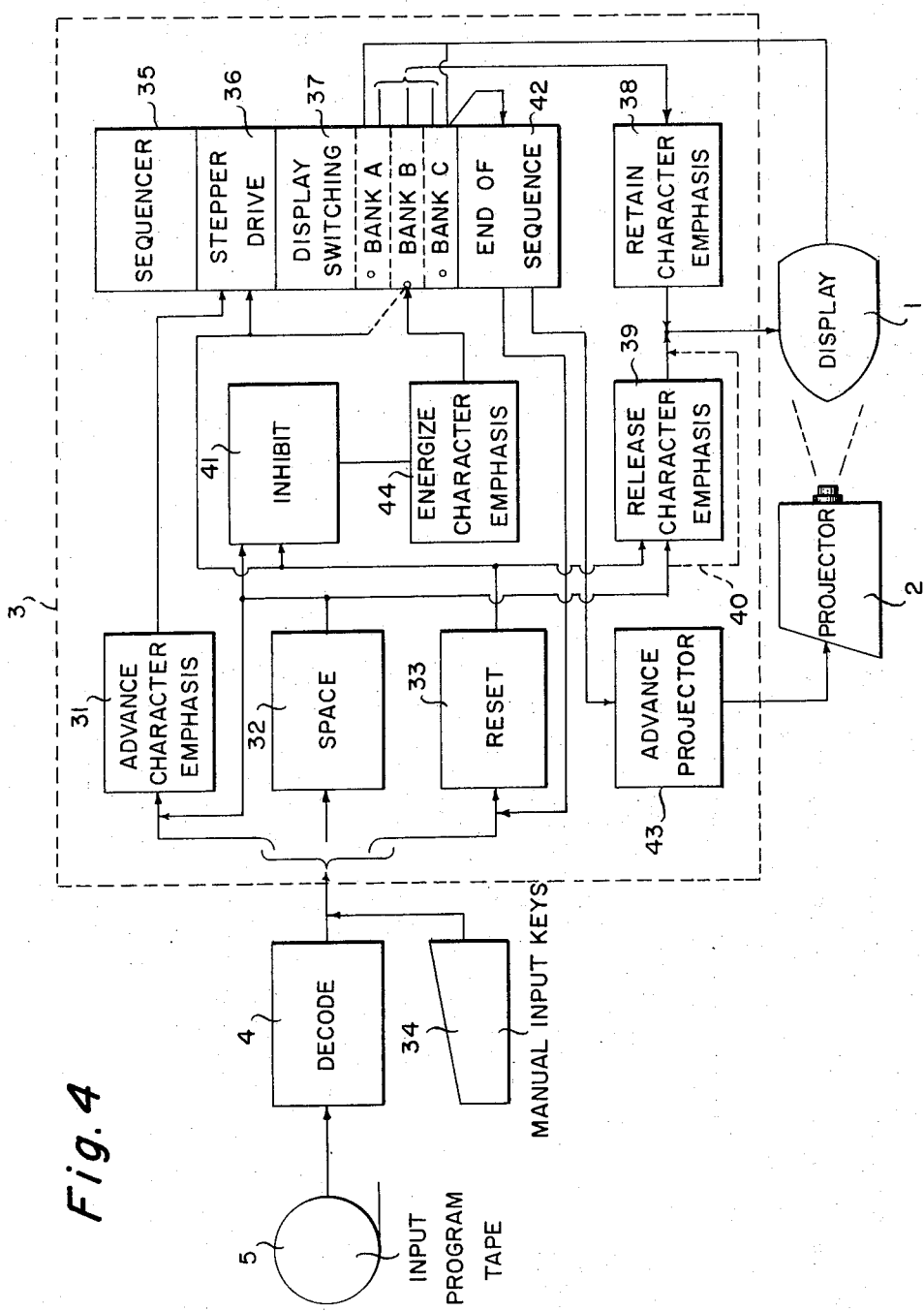
FIG. 4 is a systems diagram of the control system for the display panel.

Referring to FIG. 1, the apparatus of this invention includes a display panel indicated generally at 1. The panel depicted is a rear projection screen adapted to display images from a projector 2 of a known slide or film strip type which will project a visual image and having provision to advance successively through a program of slides or frames of different images. Control of the advancement of the projector is derived from a control device 3 to be described in detail with reference to FIGS. 4 and 5, and the control device itself is synchronized to a prerecorded program of audible instructions and control cues through decoder 4 and a conventional tape deck such as a cassette tape player 5.

The display panel 1 includes a rear projection screen 6 of translucent plastic which presents to the student a visible reproduction of the image projected against its rear surface. In the preferred embodiment illustrated in FIG. 1, this image comprises three lines of characters each including a maximum of 20 characters and spaces, or a total of 60 characters and spaces in the three lines comprising one sequence (i.e., one frame or slide in the projector) of instructional material. Obviously, other arrangements are possible, the illustrated embodiment having been chosen to incorporate in one sequence the equivalent of one line of average typewritten text.

In order to provide a pacing function by which the student is stimulated to a response comprising typing of the characters in an appropriate time pattern it is appropriate to provide a means of progressively emphasizing each character within a succession of groups (i.e., words) throughout the sequence or for progressively emphasizing whole groups or subgroups within the sequence. To this end, and referring to FIGS. 2 and 3, activatable means for underlining each character is provided in the form of a line of distinctively colored optically translucent plastic material comprising a plurality of segments 8 (1) – 8 (60) closely adjoining each other but separated by light barriers. Such a structure is readily formed by painting the ends of the individual segments with an opaque paint and assembling them in abutting proximity in a channel 9. The channel and the individual segments 8 have aligned openings forming a cavity 10 into which individual lamp bulbs 12 are inserted and are retained in place by a moldable plastic (not shown). Lead 13 from each bulb is connected to a common (ground) bus 15 and the other lead 14 passes through a harness 16 to the outputs of the control circuitry of FIG. 5. Each optical assembly and associated wiring is supported on a support member 11 of sufficiently narrow dimensions to leave exposed areas of the screen 6 between assemblies, thus providing for rear projection of images in a position directly over the underlining assemblies.

When viewed from the front of the screen, the underlining is not evident when not illuminated. Upon activation of a lamp for a given segment, the underlining becomes readily visible and provides a striking emphasis to the character image projected directly above it. As other segments underlining a group of characters (i.e., a word) become activated and the initially activated segments are retained in their activated state, the segments blend together because of their close abutting relationship, thus giving the appearance of a single line which incrementally grows longer and is devoid of any distinguishable demarcation between segments.

In addition to the emphasizing means just described, auxiliary indicators serve to indicate various status and timing functions to the student. To this end, a yellow lamp 17 and a green lamp 18 are provided near the upper left-hand corner of the display (as viewed by the student) and a string of three or more red lights 19, 20, 21 are placed substantially in a line from the lower right corner toward the upper left corner of the display. These lamps are energized prior to commencement of a sequence and between sequences in a manner to be described in the immediately ensuing description of the operation of the apparatus as thus far described.

OPERATION OF THE DISPLAY PANEL

In operation, a program of audio instructions and cueing signals for operation of the emphasizing lights, auxiliary indicator lights, and projector advance mechanism is placed on magnetic tape in a manner yet to be described. The manner in which the program actually appears on the tape is not a part of this invention, and reference is made to my aforesaid Pat. No. 3,377,716 and to application Ser. No. 80,354 for disclosures of such programs on magnetic tape. At this point it should suffice to say that the tape includes audio instructions which, upon playback, are reproduced in a conventional amplifier and speaker (not shown). Additionally, the tape includes cueing signals each of which is coded (e.g., is of a distinctive frequency) to operate a particular control element at an appropriate point in the audio narrative. One of the codes, such as a first distinctive frequency, serves to advance a stepping switch which initially activates yellow light 17 to serve to prepare the student by indicating to him that the program is commencing. Successive occurrences of this particular code result in successive advancements of the stepping switch whereby the yellow light is caused to pulsate three times, after which the green light 18 pulses once. The rate of pulsation, as established by the prerecorded program, indicates to the student the average timing to be expected prior to commencement of a solicitation of response. On the step following the single pulse of the green light 18, character emphasis segment 8 (1) is energized, and subsequent stepping of the switch serves to sequentially energize succeeding segments 8 (2) . . . until a space pulse is reached. As each segment is energized, it remains illuminated by virtue of latching relay circuits to be described in detail in conjunction with FIG. 5. Thus, the underlining appears to incrementally grow, character by character, until it extends under an entire group, such as a syllable, word or the entire visual image sequence. Another of the codes such as a second distinctive frequency, operates to advance the steppping switch as does the first code, but also inhibits activation of the emphasizing light associated with that particular step. This code is normally used to avoid lighting that segment appearing under a space between words. In addition to advancing the stepping switch while inhibiting illumination of the space seqment, this pulse optionally may or may not reset the latching relays to deactivate all previously activated segments. Thus, depending upon the optional use of this provision, the emphasis lights for each word may either (1) be retained in the illuminated state until completion of an entire sequence, or (2) be extinguished upon completion of each word.

Upon reaching the end of the sequence (i.e., all of the characters projected on the display at one time), the red lights 19, 20 and 21 are momentarily energized in a sequence progressing from the lower right-hand corner of the display (the end of the sequence of characters) toward the upper left-hand corner, thus drawing the student's attention toward the point of commencement of the next sequence, after which a third code, termed a "reset" code, initiates advancement of the sequencing means in a self-stepping manner whereby it rapidly traverses the remaining switch contacts and stops on the home position where the aforedescribed cycle of yellow and green lights will signify the commencement of the following sequence. At the same time, the reset code serves to release any character emphasis lights currently under retention, and to inhibit energization of other character emphasis lights during the self-stepping of the sequencer. As another switching function in the end of sequence routine, the stepping switch activates a projector advance circuit to cause the next frame or slide of character images to be visually projected on the display screen.

Inasmuch as the first two cueing codes mentioned above have their functions reversed in certain modes of operation to be described in connection with FIG. 6, the first code will be referred to herein as a CH code when used in its normal sense to activate an underlining segment and thus emphasize a character, and as a $\overline{CH}$ code when used in the opposite sense with the circuitry of FIG. 6 wherein the same code establishes the metes and bounds of a character group (i.e., word or syllable). Similarly, the second code will be referred to as the SP code in its normal sense of inhibiting activation of an underlining segment, and as the $\overline{SP}$ code when used in its opposite sense.

DESCRIPTION OF OVERALL SYSTEM FUNCTIONS

For a general understanding of the functions performed within the display control device 3, particular reference is made to FIG. 4 which is a system diagram of the overall system. As mentioned before in the discription of FIGS. 1–3, the pre-recorded program is read out on a conventional playback machine 5 which serves to audibly reproduce the narrative instructions and to transmit a signal derived from the program to the decoder 4. The decoder functions to extract from the signal those portions which comprise cueing signals and to distinguish between the various cueing signals on the basis of the particular code in use. Assuming the use of distinctive frequencies as the code, a first frequency, disignated a CH cue, is detected and in response thereto a character pulse is generated and fed to a first output which in turn is applied to the CH input of the control device 3. The presence of a pulse at this input serves to initiate advancement of character emphasis through means indicated by reference numeral 31. Likewise, a detection of a second frequency results in generation of an SP pulse which is fed to the SP input of control device 3 from whence it initiates a space function at 32. Further, a third frequency brings about the application of a reset pulse to the RESET input of control device 3 where it initiates at 33 a reset function. In more sophisticated embodiments of this apparatus additional functions may require the use of additional codes, this description being limited to three code functions solely in the interest of clarity.

As indicated at 34, each of the inputs has provision for manual keying in order to manually advance the display for purposes of testing, synchronizing display with program, etc.

The CH pulse accomplishes its function of advancing the character emphasis on display 1 by simply energizing the stepper drive 36 of sequencer 35. A full cycle of energization and release (i.e., upon completion of the CH pulse) of the drive 36 results in advancement of contacts of the display switching device 37 by one increment. The switching device thus incrementally advances progressively through the contacts of banks A, B and C as successive CH pulses are encountered. The details of switching will be described more fully in respect to the circuit of FIG. 5, but generally result in the feed of an energizing current from source 44 to activate various elements on the display panel, shifting from element to element as the sequencer is incrementally advanced by its stepper drive 36. The auxiliary lights 17–21, which are energized only briefly upon receipt of cueing signals at the beginning and end of a sequence, are activated directly from certain contacts of display switching banks A and C, whereas the character emphasizing lamps 12 for segments 8 (1) . . . 8 (60) are energized in sequence from other contacts of from all three banks through respective latching relays. The latching relays serve as means 38 to cumulatively retain the character emphasis in its activated state until released by means 39.

A pulse at SP input triggers three functions. First, the output of means 32 sends a pulse to means 31 thus serving to repeat the operations outlined above wherein the display activation switch means 37 is advanced by one increment. However, as a second function occurring concurrently with this advancement, means 32 activates inhibit means 41 to prevent energizing means 44 from illuminating the particular display element corresponding to the advanced position of the switching means 37, namely the "space" position between character groups. Thirdly, means 32 causes means 39 to release the character emphasis previously retained on the display 1 by releasing the latching relays of means 38. As indicated by dotted line 40, an alternative embodiment would shunt out triggering of release means 39 by the SP pulse and thus permit character emphasis retention means 38 to remain effective throughout an entire sequence.

Turning to reset means 33, it can be seen that the reset function can be triggered by either an input at the RESET input terminal from decoder 4 (or manual reset at 34) or it can be triggered by a signal from the end of sequence switch portion 42 of the sequencer. In either instance, reset means 33 initiates operation of stepper drive 36 in a manner by which the drive self-steps through an entire switching sequence for one bank of contacts. At the same time the output of reset means is fed to display switching means 37 to cause that means to switch back to switch bank A so that upon completion of the self-drive sequence, the sequencing mechanism comes to rest in its "home" position where it is ready to start another sequence. In order to prevent flashing of display lamps during the self-drive sequence of switching, the output of reset means 33 is applied to inhibit means 41, and a hold circuit within reset means 33 maintains its output until the home position is reached. Just prior to reaching the home position, the display switching means 37 passes through an end of sequence routine, indicated as means 38, which includes triggering of a projector advance pulser 43, thus serving to advance the film strip or slide of projector 2 by one frame to project the next succeeding sequence of characters on the screen of display 1.

DESCRIPTION AND OPERATION OF CIRCUITRY OF FIG. 5

Figure 5:
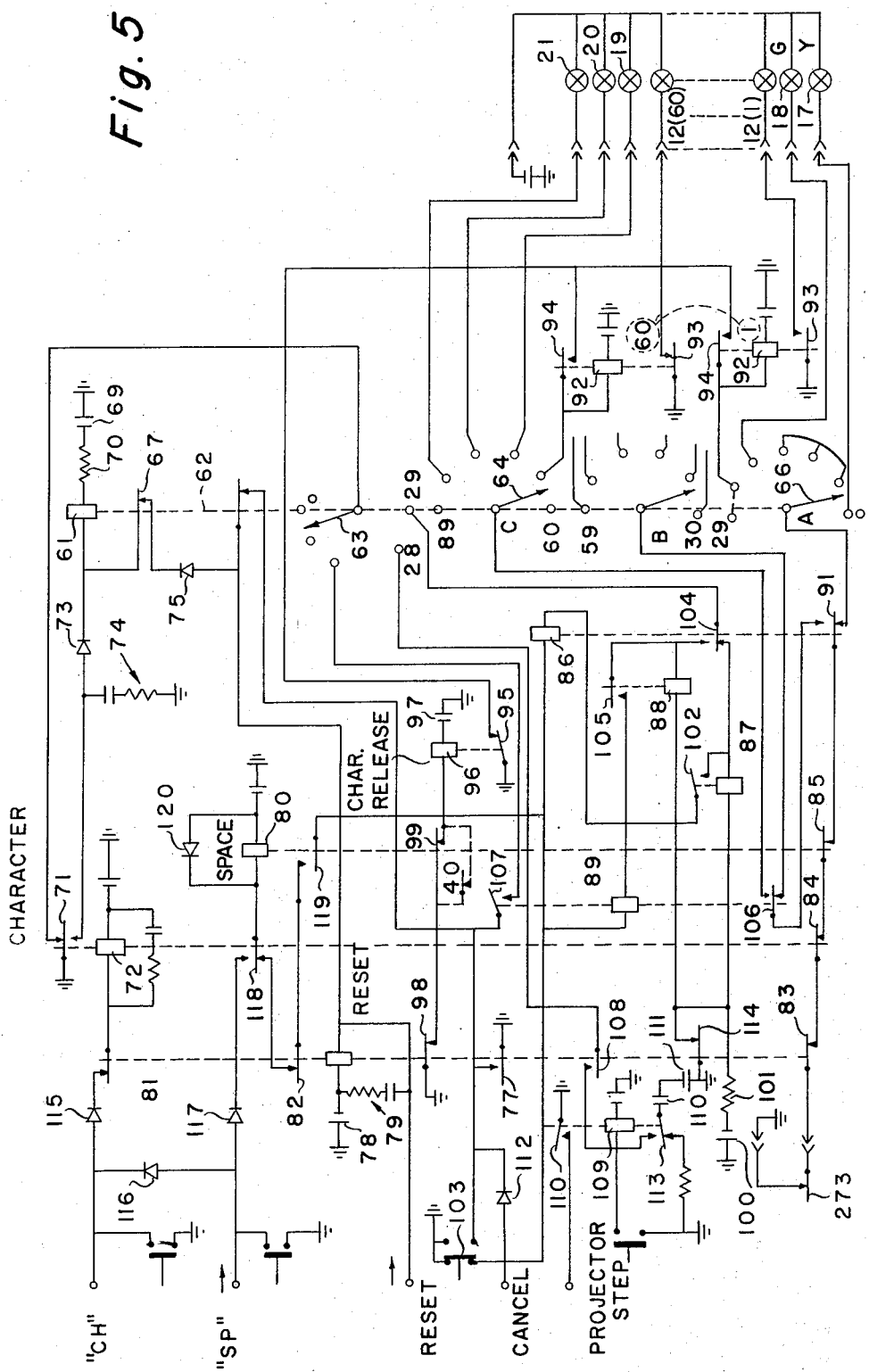
FIG. 5 is a schematic diagram of the system of FIG. 4.

Referring to FIG. 5, sequencer 35 comprises a stepping switch of the type manufactured by North Electric Company of Galion, Ohio, and identified as model RVK is driven incrementally by stepper coil 61. As the coil 61 is energized, a drive spring (not shown) is tensioned so that, upon subsequent deenergization of the coil, the switch armature (indicated diagrammatically by dotted line 62) is rotated counterclockwise one step to advance wiper arms 63, 64, 65, 66 by one contact element. Each said wiper arm serves a multicircuit bank of 30 contacts, a reduced number being shown in FIG. 5 for purposes of clarity. In actuality, these contacts form a complete circle whereby upon completion of a cycle of 30 contacts the switch advances to its home or contact position designated "zero". In addition to the multicircuit contact banks, the stepper switch includes a normally closed interrupter switch 67 which is opened only during the energized condition of the coil 61, and an off-home switch 68 which is open when the stepper switch is in the home position and closed in all other positions. The coil 61 derives its operating power from a source indicated as battery 69 through voltage dropping resistor 70. In the interest of clarity the symbol for a battery is used throughout FIG. 5 to designate a suitable source of direct current power, which in actual practice is a conventional 48 V power supply. Dropping resistor 70 serves to reduce this voltage to the 24 V operating characteristic of this particular coil.

Control of the coil 61 may come from either of two sources. First, for incremental advancement of the stepping switch, contact set 71 of character relay 72 serves, during energization of relay 72, to complte a circuit to ground through its lower contact and diode 73, RC circuit 74 serving to dampen voltage spikes arising incident to contact making and breaking. Secondly, during reset, a circuit is completed to cause the switch to self step through all remaining contact positions and come to rest at the home position. In the latter instance, upon energization of reset relay coil 76, control is derived from interrupter contacts 67, blocking diode 75 (the latter serving to prevent sneak circuit energization of reset circuits by the character relay contact set 71), off-home contact set 68, and reset relay contact set 77 to ground. The series circuit from reset relay coil 76 through off-home contact set 68 and contact set 77 additionally serves as a holding circuit to maintain reset relay 76 energized until the stepping switch has advanced to the home position, whereupon the hold circuit is broken by opening of the off-home contacts 68. The reset relay 76 derives its power from source 78 and includes an RC circuit 79 similar to 74. During reset, operation of character relay 72 and space relay 80 is inhibited by the opening of reset relay contact sets 81, contact 82 releases space relay if it was previously operated, and energization of display lamps during self-drive of the sequencer is inhibited by opening contacts 83, thus removing ground connection from the switch wiper arms 64, 65 and 66. In a similar fashion, energization of the lamps 12 of the segments 8 associated with the instant position of the sequencer switching elements is inhibited during incremental advancements by contact sets 84 and 85 of character relay 72 and space relay 80, respectively.

Turning to a consideration of the sequencer switching circuitry, the particular switch illustrated includes 30 contacts in each of four banks. Three of the banks, designated A, B and C, serve to determine the sequence of energization of the display elements, including preparatory lamps 17, 18, lamps 12 for segments 8 (1) . . . 8 (60), and end of sequence lamps 19 . . . 21. The remaining bank serves as a control for an end of sequence routine, including reset, projector advancement, and wiper switching (return to bank A).

A sequence begins with the wiper switching circuitry in a position to utilize bank A, i.e., with relays 86, 87, 88 and 89 de-energized as shown. Thus, an energization circuit is established for all lamps in circuit with bank A, this circuit including source, the lamps, bank A switching contacts and wiper arm 66, contact set 91 of relay 86, and the inhibit contact sets 83, 84 and 85 of the reset, character, and space relays 76, 72 and 80, and finally to ground. Accordingly in its "ready" state prior to commencement of a program, the yellow preparatory light 17 is illuminated with a steady glow. At this point, wiper arm is in contact with contact number zero.

Advancement of the sequencer by energization and subsequent release of its stepper coil 61, as by character relay 72, moves wiper 66 to its second position (contact No. 1), also connected to yellow lamp 17. At the same time, the ground circuit to wiper arm 66 is interrupted by opening of contact set 84 of relay 72, thus causing the lamp to be extinguished during switching. This cycle is repeated in two subsequent advancements of wiper 66 to the fourth contact position (i.e., contact No. 3), and upon advancement to the fifth position the yellow lamp 17 remains extinguished and the green lamp is energized. At this point the preparation lights have communicated to the student that the program is commencing, the speed at which the program is to run (i.e., speed of sequencer pulsing) and, with the green light, the fact that the next activation will be the first character emphasis segment 8 (1).

With the preparatory lamp cycle now complete, advancement of wiper 66 to the sixth position (contact No. 5) energizes latching relay 92, closing contact sets 93 and 94. Contact set 93 provides a ground for lamp 12 (1) thus completing its illumination circuit. Contact set 94 completes a holding circuit through character release relay contacts 95. Inasmuch as character release relay 96 is energized (from source 97 to ground through contact sets 98 and 99 of reset and space relays 76 and 80), contacts 95 remain closed until a space or reset occurs. Consequently, continued advancement of wiper arm 66 serves to sequentially activate each lamp 12 (1) ... 12 (25) while the latching relay associated with each lamp holds the lamp illuminated, thus serving to cumulatively retain the character emphasis as it advances. Ignoring the intervention of spaces for the moment, it is obvious that the four initial contacts involving the preparation lights plus the first 25 character advancements bring wiper arm 66 to contact number 29, thus exhausting its switching capability.

In order to proceed with activation of the next 30 segments 8 (26) through 8 (56), it now becomes necessary to switch the sequencing to bank B. In preparation for this, the arrival of control bank wiper arm 63 at its last contact (No. 29) completes a ground circuit from ground through relay 86 contacts 104 to relay 87 and a resistive battery indicated by battery 100 and series 200 ohm resistor 101. As thus energized, relay 87 closes contact set 102 to complete a circuit to prepare relay 86 for energization in series with relay 87 when the ground is removed from wiper arm 63. At this instant, the ground through wiper arm 63 serves to keep relay 87 energized while it shunts the coil circuit of relay 86 to ground. Upon the next advancement of the sequencer by character relay 72, the latter's contact set 71 is opened and wiper 63 moves off contact No. 29 thus removing the shunt-to-ground of relay 86 and transferring the ground path for relay 87 through its own contact set 102 and a series circuit with the coil of relay 86 and manual reset contacts 103. Thus, as the sequencer advances from contact 29 to contact zero relay 86 pulls contact set 104 up and transfers the ground circuit from wiper arm 66 of bank A to arm 65 of bank B.

Subsequent advancement of the sequencer serves to activate lamps 12 (26) through 12 (56) in a similar manner, retaining the character emphasis of corresponding segments 8 (26) ... 8 (56) through latching relays in the same manner as described in connection with relay 94.

Upon exhaustion of the switching capability of bank B, a similar wiper switching operation transfers display switching to bank C. In this instance advancement of wiper arm 63 to its contact position 29 again establishes a ground for the wiper switching circuit. Relay 86 being energized, contact set 104 is up, thus routing the ground connection to relay 88 and again to the resistive battery indicated as battery 100 and resistor 101. Relay 88 functions as did relay 87 to establish a circuit through its contact set 105 in anticipation of energization of relay 89 when the ground circuit of wiper 63 is removed. Hence, the next advancement of wiper arm 63 removes the shunt-to-ground connection of the coil of relay 89 and leaves it connected in series with the coil of relay 88 to battery 100, thus energizing relay 89 and lifting its contact set 106. The ground circuit including contacts 83, 84, 85 and raised contact sets 91 and 106 is thus transferred to wiper arm 64 of bank C for subsequent energization of the remaining lights of the sequence.

Only four emphasizing segment lights remain for illumination in the illustrated sequence, it being obvious that the sequencer has a capability of handling a larger display. The four remaining lights 12 (57) ... 12 (60) are sequentially illuminated by the advancement of arm 64 through contacts 60 ... 63, the latching circuits functioning as before. Further advancements over contacts numbers 64 ... 66 illuminate lamps 19 ... 21 in sequence. Inasmuch as there is no retention of the illumination of these "end of sequence" lights, no latching relays are involved and each lamp remains illuminated only for the interval between advancement pulses.

The contact of the end of sequence control bank (wiper arm 63) which corresponds to the last contact of bank C used in the sequence (i.e., contact No. 66) is contact No. 6. Consequently, contact No. 7 of the control bank is reached with the next advancement after the three end of sequence lamps 19–21 have pulsed. In view of the fact that the wiper switching circuit is set for bank C wherein contact set 107 is closed, a reset function is initiated by the grounding of reset relay 76 through contact set 107 of relay 89 and the "off-home" contacts 68 of the sequencer. As previously described, this circuit also grounds the step drive coil 61 through interrupter contacts 67 to cause the sequencer to self-drive to its home position (i.e., zero contact) where the off-home switch 68 opens to terminate self drive. As reset relay 76 is actuated, contact set 98 opens to drop out character release relay 96, thus opening contacts 95 to in turn drop out the holding circuit to all latching relays 92 and extinguish any character emphasis lights which up to that time are being retained in the illuminated state.

As self-drive of the sequencer takes place, wiper 63 completes a ground circuit through its contact No. 8, reset relay contact set 108 to projector advance relay 109. Energization of this relay closes contact set 110 to ground the projector step terminal which in turn is effective to advance the film or slide drive of projector 2 and exhibit another optical image, or sequence, on display panel 1. In order to assure that the projector step terminal remains grounded for a sufficient time interval to actuate the advance mechanism of the projector 2, a capacitor 110 is charged by a battery designated 111 and, upon energization of relay 109, is connected by contacts 113 to the energization circuit for the coil to provide approximately ½ second delay of release.

As sequencer 35 self drives to its home position, the wiper switching circuitry is de-energized by the closing of contact set 114 and consequent shunting to ground of resistive battery 100, 101, effectively removing the source of energization for relays 86, 87, 88 and 89, and causing contact sets 91 and 106 to drop to their lowest contact. In this state, wiper arm 66 of bank A is readied for the following sequence.

In the way of summary, a typical program of operation will commence with all contacts as shown in FIG. 5 except that character release relay 96 is normally energized, thus contact set 95 is closed. With tape player 5 set at the beginning of a program and film strip of projector 2 on a blank or title frame prior to the first sequence, the tape deck 5 is started. The first cueing signal is a reset pulse which assures all relays 92 are cleared, the sequencer self-drives one revolution to home, bank switching is at bank A, and a projector step output serves to bring the first character sequence into display.

As the program continues, cueing signals in the nature of CH pulses are decoded at 4 and applied to the CH input. Each pulse received at that terminal is fed through diode 115, contact set 81 to character relay 72. Sneak circuit activation of space relay 80 is prevented by blocking diode 116. Energization of the stepper drive coil 61 by relay 72 causes one advancement of the sequencer 35 for each CH pulse recieved. As described before, the first four character pulses serve to momentarily energize the preparation lights (yellow 3 times, green 1 time) and establish a timing which the student may anticipate in the character sequence. The fifth CH pulse actuates the first character emphasis light 12 (1) through latching relay 92 (1) which retains the illumination thereof. It is assumed that the first word, as illustrated in FIG. 1, is the three letter word DID. Further pulses received at the character relay cause sequential advancement of the sequencer and consequent illumination of the lamps 12 (2) and 12 (3), the latching relays 92 (2) and 92 (3) again serving to retain the lamps in their illuminated state. The net result to this point is that the segments 8 (1) ... 8 (3) underlying respectively the characters D, I and D have been sequentially illuminated and cumulatively retained in that state as the first word becomes completely underlined.

The next cueing signal in the program is an SP pulse which is identified in decoder 4 and applied to the SP input terminal, where it is effective through diodes 116, 115 to energize character relay 72 and bring about another incremental advancement of sequencer 35. At the same time, the SP pulse passes through diode 117 where, upon pick-up of contact set 118 by relay 72, space relay 80 is energized. Energization of space relay 80 opens contact set 99 to drop out character release relay 96, thus opening the holding circuit of latching relays 92 and extinguishing the illumination of segments 8 (1) ... 8 (3) underlying the characters DID.

In an alternative embodiment wherein the retention of character emphasis is to be retained for each group of characters (i.e., word) throughout the sequence, contact set 99 may be shunted as indicated at 40 to avoid dropout of character release relay 96 upon energization of space relay 80. Energization of space relay 80 also opens contact set 85 to remove the ground from wiper 66, and in so doing inhibits energization of relay 92 (4) as the pulsing of sequencer 35 advances wiper 66 to that position. Thus, the segment 8 (4) underlying the space is not illuminated and all of the emphasis of the display panel is confined to segments underlining actual characters.

It is essential that the inhibition of energization of the segment 8 (4) remain effective until a subsequent advancement of the sequencer moves wiper arm 66 off of the contact for relay 92 (4). To accomplish this, a holding circuit is established through reset relay contact set 82 and space relay contact set 119. Diode 120 in shunt with space relay coil 80 provides a delayed dropout of relay 80. This delay is sufficient to survive the transfer period of contact set 118 as character relay 72 drops out. Thus, upon cessation of the SP pulse at the space terminal, relay 72 is immediately de-energized to drop out contact set 118, relay 80 and its contact set 119 remaining up due to the time delay of shunting diode 120. Once contact set 118 drops, a holding circuit for space relay 80 is established through contacts 118, 119 and reset key contacts 103 to ground, and space relay remains energized.

Further advancement of the program effects application of a signal at CH input to bring about emphasis of the first character Y of the second word YOU. Consequent operation of relay 72 lifts contact set 118 to break the hold circuit, thus dropping out space relay 80 and removing the inhibition to illumination of segments 8 (5) et seq. Segment 8 (5) is illuminated to establish and maintain emphasis of the letter Y and the cycle repeats to progress through the sequence, where the aforedescribed end of sequence routine takes place.

Having described a first embodiment of the invention, it is apparent that its operation is controlled by a relatively simple taped program requiring only three cues (character, space, and reset) which are located on the tape in exact correspondence with the point at which the particular response is solicited. A feature of this invention is the ease with which such a program may be produced, which method will be described in conjunction with the encoder of FIGS. 7 and 8.

DESCRIPTION AND OPERATION OF THE CIRCUITRY OF FIG. 6

The teaching device of this invention as thus far described may be termed a character response solicitation in that the student receives a separate indication of each individual character to which response is being solicited. As the student's proficiency increases, he reaches a point where his thought processes no longer need to consider each character individually. His speed will now be enhanced by conceptually considering identifiable groups of characters, such as syllables and words, the manipulation of individual keys becoming a matter of instinctive response to the group concept derived from such a consideration. Thus, in advanced training, it is appropriate to discontinue individual emphasis of each character and turn to a simultaneous emphasis of all characters in the syllable or word, progressing through the sequence group by group rather than character by character. In such a presentation, the student's mental or conceptual response is to the group, whereas his physical response is manifested in individual manipulation of keys. To this end, the circuitry of FIG. 6 is interposed between the latching relays 92 and the display lamps 12 of FIG. 5.

This interposition of the logic circuitry of FIG. 6 in essence reverses the function of relays 92 so that energization thereof energizes a relay of FIG. 6 to hold a lamp extinguished, and intervening lamps for which respective relays 92 remain de-energized are subsequently illuminated by the logic circuitry. It follows that a program for group stimulus (i.e., word or syllable stimulus) differs from the aforedescribed character stimulus program in that the function of the CH and SP cues are reversed. As so reversed, they will be referred to as $\overline{CH}$ and $\overline{SP}$ cues, respectively, Moreover, the cues for a group appear at a point in the program somewhat in advance of their counterparts in a character stimulus program. The advanced position is necessitated by the fact that the logic circuitry of FIG. 6 must receive instructions as to the number of characters in a group prior to activation of lamps for that group.

The simplest program involves successive activation of the emphasis lamps 12 in groups, each group consisting of a single complete word. In this instance each group of characters is readily identifiable as a word by the occurrence of spaces on either side of the word. Thus, a two letter word such as IN requires a program which, in advance of activation of the display, instructs the logic circuitry to condition itself to (1) leave a space, (2) count and prepare to simultaneously illuminate character segments 8 (n) . . . 8 (n + 1), and (3) illuminate the prepared segments and leave a space at segment 8 (n + 2). Assuming that the visual image of the word IN is displayed over emphasis segments 58 and 59, a $\overline{CH}$ pulse will occur on the program as sequencer 35 reaches the contact position for segment 57. The circuitry of FIG. 5 then functions to activate relay 92 (57), contacts 93 of which close to energize relay 257. As seen in FIG. 6, relay 257 and the corresponding relays of other lamps 12 (1) . . . 12 (60) each include seven contact sets, identified for convenience as chains A through G. Reference numerals for individual relay contact sets have been omitted, in order to preserve simplicity in the drawing. In lieu thereof, relay contacts will be identified in this specification by the relay number followed by the letter of the contact chain or bank. Thus the contact set in the circuit of bank F and activated by relay 257 is identified as contact set 257F. The function of this bank is to enable or to inhibit operation of its respective lamp, hence bank F is referred to as the inhibit bank.

The energization of relay 257 opens contact 257F to disable lamp 12 (57), thus carrying out the first instruction to leave a space (i.e., a de-energized lamp) at segment 8 (57).

Following this, the program will include two $\overline{SP}$ pulses which result in the stepping of sequencer 35 to positions 58 and 59. Inasmuch as the space relay 80 has inhibited activation of relays 92 (58) and 92 (59), relays 258 and 259 also remain deenergized and contact sets 258F and 259F remain closed. In the closed position of contact sets 258F and 259F, lamps 12 (58) and 12 (59) are enabled or prepared for subsequent illumination. Thus, the logic circuitry has carried out a portion of its second instruction, namely to count the number of positions allotted to characters.

To advance the sequencer to segment 8 (60), a $\overline{CH}$ cue is used. As before, this cue, decoded and fed to the CH input terminal, causes advancement of the sequencer and energization of relay 92 (60) which in turn energizes relay 260. As 260 becomes energized, contact set 260F opens to disable lamp 12 (60) and establish that segment 8 (60) will remain de-energized to thus define the space following the word. Also, energization of relay 260 closes its contact set 260D to B+. B+ is thus supplied to contact set 259D which, being de-energized as shown, in turn passes B+ to 258D and on to 257D. The normally closed switches of bank D thus provide a circuit which "looks back" to find the beginning of the group of characters, and thus comprise the rectrocede bank of switches. Relay 257 defines the location of the space preceding the word in accordance with the first instruction set forth above. Being in its energized state, contact set 257D passes B+ to contact set 257E, thus transferring the energizing circuit from the succeeding switches of bank D to the succeeding switches of bank E. The normally open switches of bank D may be appropriately identified as the transfer bank.

At this point, the B+ circuit has commenced at the space following the word and has, through the previously established position of the contact array, searched out the space preceding the word to determine the length of the word, i.e., the number of intervening segments to be illuminated. The connection of B+ to contact set 257E passes B+ back to contact bank E of the intervening segment relays 258 and 259 and establishes a series energizing circuit for the group of lamps 12 (58) and 12 (59) through their respective contact sets E and F. Bank E is termed the group bank. Energization of all segments of the word occurs simultaneously with energization of relay 260, thus completing the third instruction and providing a word response stimulus rather than individual character response stimulus.

It can be seen that the reversal of cueing signals in a program used with the logic circuitry serves to abort all holding functions of relays 92. While the relay 92 associated with a space (triggered by a $\overline{CH}$ pulse in this instance) is temporarily latched, the advancement to the first character position of the group (by an $\overline{SP}$ pulse) serves to release the latched relay by virtue of the operation of character release relay 96. This is essential to proper operation of the logic circuitry wherein a unique holding requirement involves what may be termed "leap frog" holding. In the course of this holding operation a relay defining a first space is held while the relay defining the next, or second space is also energized and held. However, upon energization (and hold) of a relay defining a third space, the first relay is released. Thus, in leap-frog fashion, the holding function transfers from one relay, past the next held relay, and comes to rest with a third, only two relays being held in the energized state at any one time. This leap-frog holding is accomplished in contact chains A, B and C, and can best be understood by a consideration of a two word sequence.

For simplicity, we may consider a three letter word followed by a two letter word. While the diagrammatic representation of FIG. 6 indicates by the dotted lines between relays 203 and 257 that numerous additional relays appear therebetween, this discussion will ignore the intervening relays and assume that relays 203 and 257 are consecutive relays having their contact sets of each chain connected as indicated by the dotted lines. The visual image projected on display 1 includes a space at segment 8 (1), three characters (letters) appearing respectively at segments 8 (2), 8 (3) and 8 (57), a space at 8 (58), and two characters respectively at 8 (59) and 8 (60). Accordingly, the program will present a $\overline{CH}$ pulse at the sequencer position for relays 201, 258, 261, and $\overline{SP}$ pulses at the sequencer position for relays 202, 203, 257, 259, and 260. As the first $\overline{CH}$ pulse is encountered, relay 201 will be energized and will establish a hold circuit through contact set 201A, all subsequent contact sets of chain A, and contact set 270 of cancel relay 263. As the switching sequence passes character positions 2, 3 and 57 no change occurs in the holding circuit inasmuch as relays 202, 203, and 257 remain de-energized. When relay 258 becomes energized in response to a $\overline{CH}$ pulse to establish the space which defines the end of the first word, the holding circuit is maintained by transferring the train of connection to bank C prior to breaking the connection in bank A. For this purpose, relays 201 . . . 262 are so constructed as to make the normally open (N.O.) contact of bank C before breaking either the normally closed (N.C.) contact of the same bank or the normally closed (N.C.) contact of bank A. The holding circuit for relay 201 may now be traced from the coil 201 through contact sets 201A (N.O.), 202A (N.C.), 203A (N.C.), 257A (N.C.), 258C (N.O.), 259C (N.C.) . . . 262C (N.C.), 270 and ground. Relay 258 is itself held energized by the circuit including contact sets 258A (N.O.), 259A (N.C.) . . . 261A (N.C.), 270 and ground.

As the sequence progresses to the second word, namely the two-character word occupying segments 8 (59) and 8 (60), again no change occurs in the holding circuit inasmuch as relays 259 and 260 remain de-energized. Now relay 261 is energized in response to a $\overline{CH}$ pulse indicating the end of the two-letter word, the holding circuit for relay 258 is transferred to bank C in the same manner as aforedescribed in connection with the energization of relay 258. As so transferred, the holding circuit for relay 258 may be traced from its coil through contact sets 258A (N.O.), 259A (N.C.), 260A (N.C.), 261C (N.O.), 262C (N.C.), 270 and ground. In the instant following opening of contacts 261C (N.O.), contacts 261C (N.C.) become open. Hence, the hold circuit for relay 201 is broken, and relay 201 drops out, opening its contact set 201D (N.O.) to extinguish lamps 12 (2), 12 (3) and 12 (57). Simultaneously therewith, a new hold circuit for relay 261 is established through contact sets 261A (N.O.), 270 and ground. Thus, the holding function has been removed from relay 201, has leaped relay 258 which remains held, and has been established for relay 261. The emphasis underlying the three character word is extinguished and that underlying the two letter word is illuminated.

The preceding mode of operation has concerned itself only with one syllable words. Where multi-syllable words are present in the sequence, a variation in the aforesaid programming is necessary in order to incrementally emphasize individual syllables within the word while avoiding any provision for a space between consecutive syllables. The apparatus of this invention is susceptible of programming in two ways, hereinafter termed "syllabic individual" and "syllabic cumulative". In the syllabic individual program, as each syllable of a word is illuminated in a sequence progressing through the word at the solicited typing speed, the preceding syllable is extinguished. In the syllabic cumulative program, the illumination of each syllable is retained until the entire word is complete. Here, the cumulative effect is to build the entire word and then to extinguish the entire word at one time.

Figure 6:
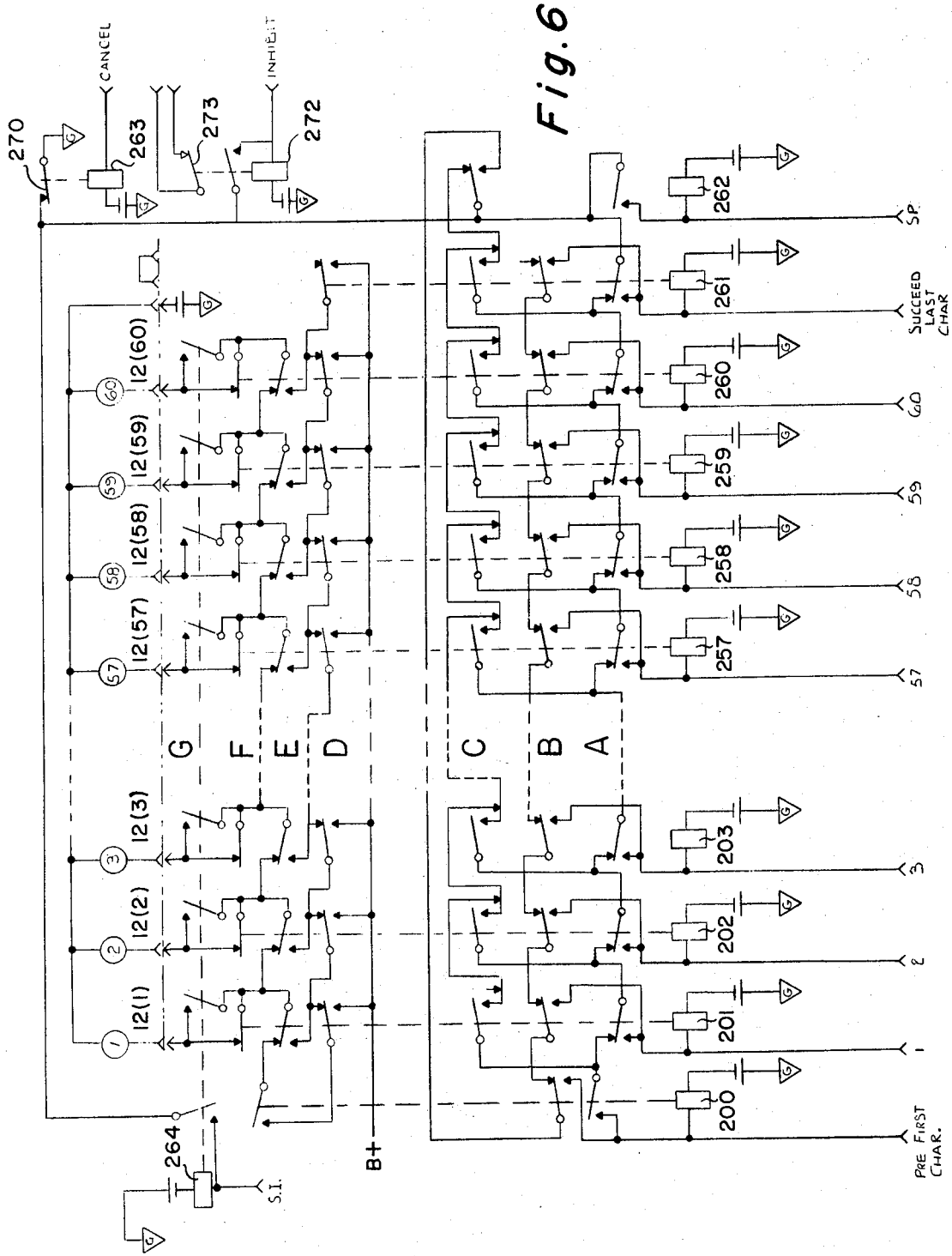
FIG. 6 is a schematic diagram of the logic control circuits for the display panel.

To program the apparatus of FIG. 6 for syllabic response, additional cueing signals are called upon. For simplicity of identification, these additional signals will be referred to as an SI cue for syllabic individual programming, and as an SC cue for syllabic cumulative, and a CA cue to cancel the effect of either the SI or SC cue.

Considering first an operation under syllabic individual programming, and again turning to FIG. 6, it may be assumed that a sequence includes a number of single syllable words and that the logic circuitry has performed as previously indicated to a point where a multi-syllable word is encountered. An $\overline{SP}$ pulse appears to relay 201 to pass by the same and establish the space which immediately precedes the multi-syllable word. At the point in the program for advancement to the position of the first letter of the word, i.e. 12 (2) a first $\overline{CH}$ cue is presented to the decoder. Simultaneously therewith an SI cue is also presented, decoded, and applied as a momentary grounding connection to SI terminal leading to relay 264. Upon energization, relay 264 is retained by a holding circuit established by its contact set 271 in series with cancel relay contacts 270. As evident from the schematic, chain G of contacts is now closed to shunt out contact set F in all relays. Relay 202 becomes energized by the $\overline{CH}$ pulse and is held in the same manner as heretofore described. While contact 202D (N.O.) is closed, it has no effect inasmuch as contact 201E is open. No lamps are illuminated. Assuming two syllables of three letters each, as in the word FAVROY, two additional $\overline{SP}$ pulses serve to advance the sequencer through positions corresponding to relays 203, 257 with no activation thereof. In order to light lamps 12 (2), 12 (3) and 12 (57), to continue the sequential advancement, and also to prepare for illumination of the second syllable lights without leaving a space at 12 (58) where the letter R is displayed, a $\overline{CH}$ pulse is placed in the program at this point. Relay 258 is thus energized, serving to establish an energizing circuit for lamps 12 (2), 12 (3) and 12 (57) from B+ through contact sets 258D (N.O.), 257D (N.C.), 203D (N.C.), 202E (N.O.), and the branch circuits involving contact sets G of relay 202 and sets E and F of relays 203 and 257. Thus, the first syllable becomes emphasized. As the sequence progresses through the second syllable, relays 259 and 260 are passed but remain de-energized. Following the end of the word, i.e., at position 261, a $\overline{CH}$ cue again appears to activate relay 261, and the holding function leap frogs from relay 202 to relay 261 in the same manner as previously described. Release of relay 202 opens contact 202E to extinguish lamps 12 (2), 12 (3), and 12 (57), while at the same time the energization of relay 261 closes contact set 261D to establish illumination of lamps 12 (58), 12 (59) and 12 (60) through contacts 261D, 260D (N.C.), 259D (N.C.), 258E (N.O.), 259E (N.O.), 260E (N.O.) and the branch circuits of chains F and G of relays 258, 259 and 260.

Inasmuch as the particular relays selected for description bring the progression to the end of the display panel capability, an end of sequence routine would appear next on the program. As this routine advances wiper 63 (FIG. 5) to energize the reset relay, a signal is fed through diode 112 and applied to the cancel input, thus energizing relay 263 to open contact 270. Contact 270 is in series with all holding circuits and thus releases all relays to ready the display for another sequence.

If, on the other hand, the two syllable word has been located earlier in the sequence and is followed by single syllable words, it is necessary to return the logic circuitry from its syllabic individual response mode to the word response mode. This change is delayed for an appropriate interval during which the last syllable remains emphasized in order to provide time for the student to type all letters of this syllable. No cues appear on the program during this interval, and no advancement of the sequencer takes place. At the expiration of this interval, a CA pulse appears to activate cancel relay 263, open contacts 270, and thus de-energize syllabic response relay 264 and contact chain G. At the same time, all holding circuits are broken, thus de-energizing all relays 200 . . . 262 and placing the logic circuitry in a condition to again commence word response operation. The CA pulse does not advance the sequencer, which at this point still rests at the position of the last letter of the two-syllable word. It is now appropriate to re-establish sequencing. However, the sequencer has fallen behind due to its inoperativeness during the aforementioned interval. In order to establish illumination of the emphasis lights for the next word close on the heels of extinguishment of the last syllable of the preceding word, the program now presents a closely spaced group of cues $\overline{CH}$, $\overline{SP}$ ... $\overline{SP}$, $\overline{CH}$ to rapidly advance the sequencer through the next word. Following that, the operation continues as previously described for word-response wherein the leap-frog manner of holding is re-established.

Turning to a consideration of operation of the logic circuitry in the syllabic cumulative mode, it will be remembered that the emphasis lamps for each syllable will be illuminated progressively through a word and that the illumination of each syllable will be retained until the entire word has been illuminated. Thus, the emphasis appears to cumulatively grow, syllable by syllable, until a word is complete. Operation in this mode requires a departure from the leap-frog holding operation previously described. To this end, relay 262 is provided with contact sets A and C to alter the normal holding circuitry whereby the relay for a space preceding a multi-syllable word (and all intervening relays which are energized) remains held until cancel relay CA is operated. Relay 262 operates in response to an SC pulse which appears on the program coincidentally with the $\overline{CH}$ pulse for the character commencing the multi-syllable word. The relay is held by closure of contact set 262A. Contact 262C (N.O.) is closed to complete a holding circuit from ground through contact 270 and contact 200B (N.C.) to contact B (N.O.) and the coil of the relay simultaneously energized by the $\overline{CH}$ pulse. Assuming, as before, a program for a word having two syllables of three letters each appearing at the positions of lamp 12 (2) ... 12 (60) of FIG. 6, relay 202 thus becomes energized and held. The sequencer is advanced through the first syllable by $\overline{SP}$ pulses for each letter thereof. Upon reaching the first letter of the second syllable, a $\overline{CH}$ pulse serves to energize relay 258, thus illuminating lamps 12 (2) ... 12 (57) in the aforedescribed manner. Further progression, by $\overline{SP}$ pulses, to the end of the word brings on a $\overline{CH}$ pulse to activate relay 261. Activation of this relay and consequent opening of contact set 261C (N.C.) would normally break the holding circuit for relay 202 through chain C, but this circuit has previously been made ineffective through opening of contacts 262C (N.C.). Nevertheless, relay 202 remains energized due to the alternate holding path of 202B (N.O.), 201B (N.C.), 262C (N.O.), 270 and ground. The fact that chain C has been made ineffective as a holding circuit now leaves relay 258 without an alternate holding path as contacts 261A (N.C.) open. Relay 258 drops out. Thus the normal leap froging operation of the holding circuit has been altered to an operation where the relay for the first letter of the word is held until the word is complete but all intervening relays at the beginning of subsequent syllables drop out as that syllable becomes emphasized. This dropout of the intervening relays is essential to provide for illumination of the segments 8 corresponding to the first letter of each syllable. Following completion of a word in this mode, the system is readied for its next word in the same manner set forth in connection with syllabic individual operation.

Occasionally it may be desireable to inhibit operation of the emphasis lights during advancement of the sequencer, as where words are to be skipped, repeated, etc. In order to provide for such a program, inhibit relay 272 includes a normally closed contact set 273 in series with the grounding circuit for the wiper arms of the sequencer. When relay 272 is energized by an appropriate cue, the energizing circuit for all relays is disabled until a CA pulse serves to open its holding circuit.

DESCRIPTION AND OPERATION OF THE SYSTEMS OF FIGS. 7 AND 8

The foregoing descriptions have assumed the provision of the display in the presence of one or more students, where it is subject to direct observation. In many instances, such equipment may not be available at a teaching facility, whereas equipment of broader applicability such as motion picture projectors or cartridge television apparatus may constitute part of the visual aid equipment already on hand at a given facility. It is, of course, desirable to provide films or television recordings which may be readily distributed to such facilities so that the advantages of this invention may be utilized to its fullest extent.

Attempts at producing motion picture films or television recordings of a nature set forth herein have previously involved extremely time-consuming and expensive animating techniques. Despite such innovative approaches as the computer process for character animation as set forth in U.S. Pat No. 3,510,210, issued May 5, 1970 to Von Haney, animations remain the result of the use of transparent overlays and stop framing techniques. The "bouncing ball" technique of reader pacing in movies used to solicit timed response in group singing is a prime example. Obviously, such technique is limited to the production of recordings, whether magnetic or photographic, and cannot be used "live" to transmit directly over closed circuit or educational television broadcast. The system of this invention can be utilized, in the manner about to be described in conjunction with FIGS. 7 and 8 for animated production of magnetic recordings, photographic recordings, or live broadcast, and consequently is generically referred to in the ensuing claims as a method or system for producing an animated facsimile presentation.

Assuming that the aforementioned conventional technique were used to produce a single sequence of material as set forth in the examples discussed earlier in this specification, the following steps would be necessary. A display of the sequence "Did you say Fay and Val Favroy lived in Erie for five years?" would be prepared. Overlays corresponding to the individual segments would also be prepared. Ignoring the preliminary lights, etc., an overlay would be placed under the first letter of the first word. If the animation is to present stimuli at a rate of 12 words/minute (one key per second), 24 frames must be exposed to the display while the first overlay is in place, and this must be repeated as each succeeding overlay is put in place as well as for each space after removal of the overlays for a completed word. A total of 1,440 frames of film are thus involved in only a single sequence.

Inherently expensive and time consuming, this technique is fraught with additional difficulties and limitations. First, as mentioned in the introductory portions of this specification, a typist's speed is not a uniform metronomic rhythm. To the contrary, it varies in accordance with the degree of difficulty and positions of individual letters or combinations of letters. Consequently, a proper sequence would depart from a precise adherence to a pattern of 24 stop frame exposures at each letter or space. Determining to what extent these departures should be made throughout various texts would be extremely difficult. Moreover, these departures would vary as proficiency increases and advanced lessons involving higher speeds are encountered, thus further complicating the problem.

Hand in hand with the foregoing problem is that of "dubbing in" sound after a recording or film has been produced by stop framing techniques. This is conventionally accomplished by forming a film sequence into a loop. This would be projected on a screen where a typist would observe the sequence and, in the manner of a student, type in response to the stimuli under observation. The sound of the typewriter would be picked up by microphones and placed on the film loop slightly in advance of the point of actual reception thereof in order to compensate for the time lag of response. Obviously, errors would require that the entire dubbing sequence be started anew. Satisfactory dubbing by this procedure is undoubtedly attainable at 12 words/minute. At 20 words/minute it is still possible, but increasingly expensive due to the error factor. Beyond 20 words/minute the feasibility of such a procedure becomes increasingly doubtful until a point of impossibility is reached somewhere under 60 words/minute.

Figure 7:
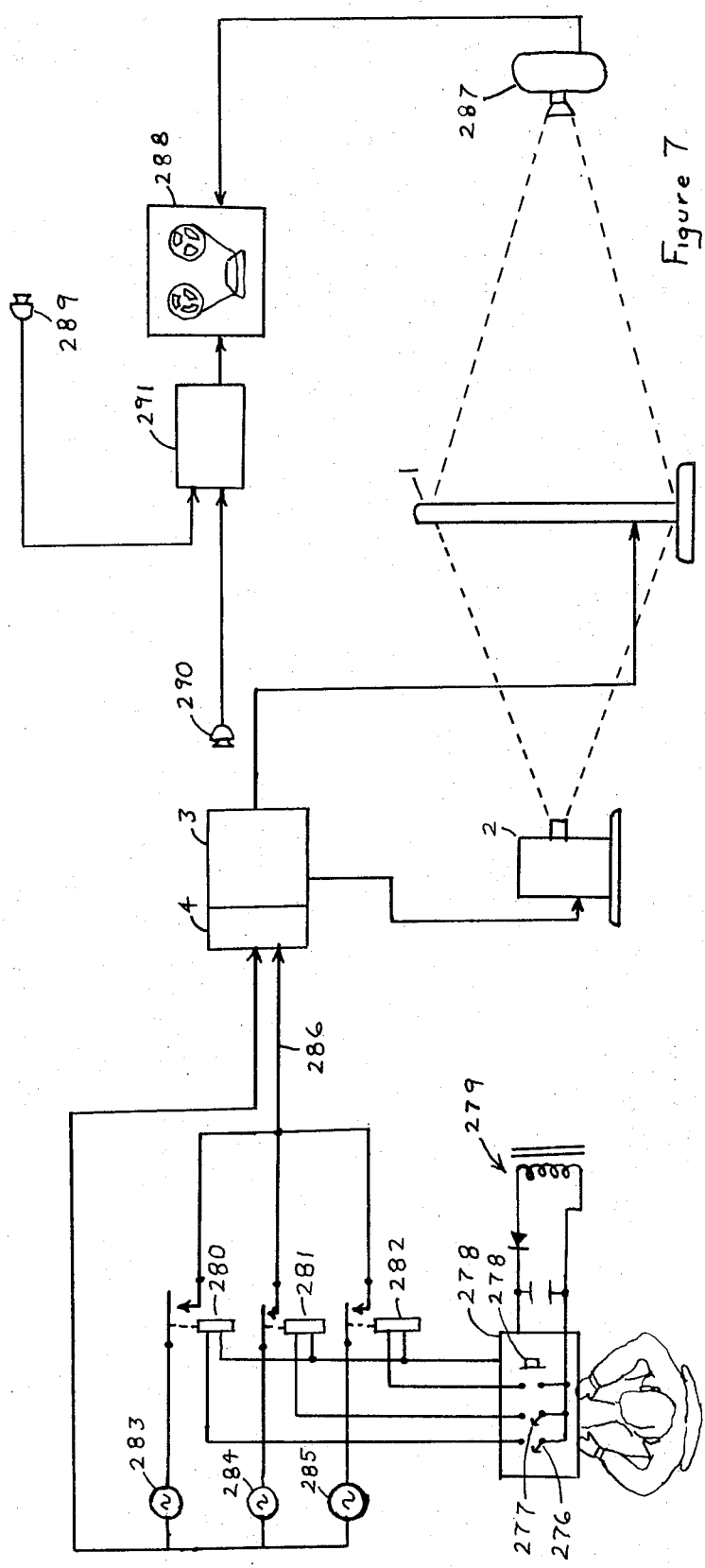
FIG. 7 is a diagrammatic view of the apparatus of this invention as used in the production of instructional motion pictures.
Figure 8:
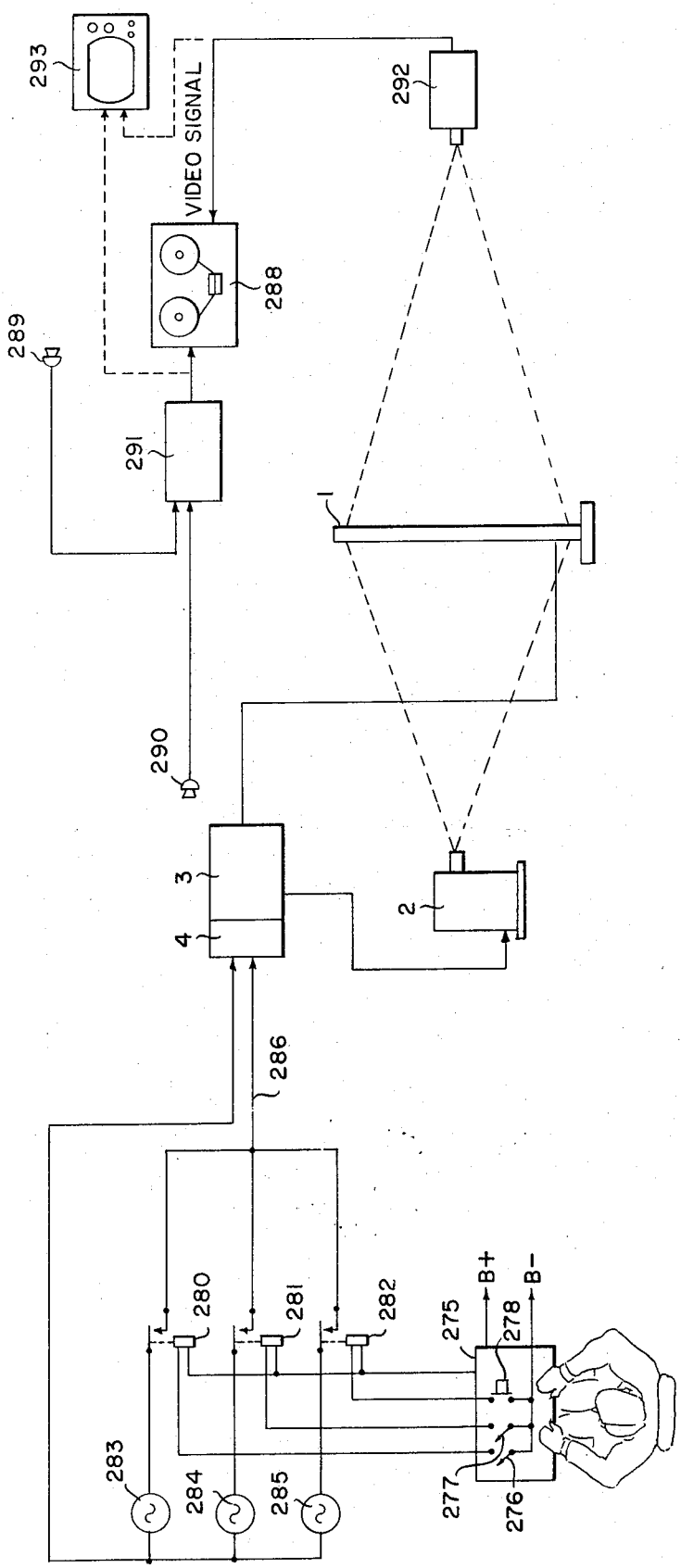
FIG. 8 is a diagrammatic view of the apparatus of this invention as used in the production of instructional video tapes.

In contradistinction to the conventional techniques, the system of this invention permits filming to be done at regular camera speeds while simultaneously recording sounds representative of typing. Referring to FIG. 7 which depicts a system for use in the production of motion picture films, the system comprises the display panel 1, projector 2, control device 3, decoder 4 arranged and utilized in the same manner as in the FIG. 1 embodiment. In this instance, however, no prerecorded program need be prepared, although it should be understood that the system could function from such a pre-recorded program by substituting the tape player 5 for the encoding apparatus now to be described. Furthermore, it will be evident that the encoding technique about to be described is equally applicable to the production of program tapes for subsequent use in the manner set forth in the foregoing description of the operation of FIGS. 1–5, in which case a tape recorder is used in lieu of the decoder 4 and all subsequent apparatus. The encoding apparatus comprises a console 275 which in actuality is a typewriter modified to include the switches indicated diagrammatically as a character key switch 276, a space bar switch 277 and a carriage return switch 278. In reality, a plurality of character key switches, one for each key, are connected in parallel. These switches are effective upon manipulation of the respective key to connect power supply 279 to relays 280, 281 and 282, respectively. Relays 280, 281 and 282 in turn connect oscillators 283, 284 and 285 to an output line 286 leading to the input of decoder 4. Oscillator 283 generates the first distinctive frequency referred to hereinbefore as a CH code. Oscillator 284 generates the SP code and oscillator 285 generates the reset code.

In operation, a typist need only perform a normal typing routine for the sequence being displayed by projector 2 to establish the proper timing of character advancements. Decoder 4, control device 3, projector 2 and display 1 function in the same manner as in the FIG. 1 embodiment, thus presenting to camera 287 an animated sequence recordable in real time directly within. At the same time, audio recording takes place so that no dubbing is required after the video recording. As audio sources, a microphone 289 is provided for use by a narrator who supplies instructions for audio reproduction. Also, a microphone 290 is disposed sufficiently near control device 3 to pick up the sound of the incremental advancements of the sequencer 35. Inasmuch as this sound closely resembles that of a typewriter and occurs simultaneously with each response solicitation, it serves as a substitute for dubbed in sound and avoids the difficulties previously commented upon. The outputs of microphones 289 and 290 are combined in audio mixer 291 and recorded in conventional fashion or recorder 288. Camera 286 includes a synchronizing signal output to recorder 288 as is conventionally provided for use in placing sound track on the film without the necessity of dubbing.

The production of video recordings in the nature of "canned" programs for broadcast or cartridge television for individual use, the operation of the encoding system is as described before. Again, and now referring to FIG. 8, the animation of the display is captured in real time, in this instance by television camera 292. Inasmuch as video recordings are made directly onto tape, the output of camera 292 is fed to recorder 288 where it is recorded simultaneously with the audio from mixer 291. Receiver 293 indicates that the audio and video may be fed directly thereto for closed circuit live presentation or both systems may be used simultaneously, as for monitoring purposes.

While the apparatus has been described in connection with the teaching of typing skills, the invention may also find application in production of animated facsimile presentations of a non-didactic nature. Where an area of a still image can be defined and segmentalized so that individually illuminable elements may be provided for each segment, it is possible by controlled sequential activation and by cumulative retention and controlled release as set forth herein to create illusions of animated motion and/or growth within the segmentalized area. As such, the invention is quite versatile and should not be limited in its scope by the exemplary descriptions of the specification, but should be interpreted in accordance with the following claims.

I claim:
1. Apparatus for teaching a sequence of responses comprising:
  a display screen for initially displaying to a student the entirety of a sequence of instruction and means for maintaining display of said sequence in perceptible form throughout a period of teaching said sequence, said sequence comprising a multiplicity of perceptible characters, each of said characters being indicative of a specific student response to be solicited at respective points in time occurring at varying time intervals throughout the period of maintenance of display of said sequence,
  said display screen including
  means energizable to individually emphasize each said character,
  means for activating said energizable means in sequence as each specific response is individually solicited,
  means for cumulatively retaining at least some of said emphasizing means in said energized state, release means for said retaining means effective to deactivate the said cumulatively retained emphasis means, means independent of student response to control said activating means, said retaining means, and said release means, said independent means including means for establishing said sequential activations at said points of time whereby said intervals vary between individual activations throughout said sequence in accordance with the nature and relationship of the individual characters, and reset means triggerable at the end of said sequence of response for activating said release means.

2. Apparatus for teaching a sequence of responses comprising the apparatus set forth in claim 1 wherein said multiplicity of characters includes identifiable groups of characters within said multiplicity and said apparatus includes means for triggering said release means at the end of each said identifiable.

3. Apparatus for teaching a sequence of group responses comprising the apparatus as set forth in claim 2 wherein successive ones of said groups of characters are separated by spaces, said apparatus further including means effective after completion of the sequential activation of emphasizing means within a group for inhibiting activation of emphasizing means associated with the succeeding space.

4. Apparatus for teaching a sequence of responses as set forth in claim 1 wherein said sequential activation establishing means comprises a prerecorded program.

5. Apparatus for teaching a sequence of responses as set forth in claim 1 including means to change said sequence being displayed, said means being activated by said reset means.

6. Apparatus for teaching a sequence of responses as set forth in claim 5 wherein said means for displaying comprises a projector of optical images and said means to change said sequence comprises advance means for said images.

7. Apparatus for teaching a sequence of responses comprising:

a display screen for initially displaying to a student the entirety of a sequence of instruction and means for maintaining display of said sequence in perceptible form throughout the teaching of said sequence, said sequence comprising a multiplicity of perceptible characters, each of said characters being indicative of a specific student response to be solicited at a point in time during retention of display of said sequence, said display screen including means energizable to individually emphasize each said character comprising a segmentalized line of illuminable light transmitting material mounted on said screen, the segments thereof abutting one another, being separated by an indiscernibly thin light barrier, and being individually energizable, means for activating said energizable segments in sequence as each specific response is individually solicited, means for cumulatively retaining at least some of said emphasizing means in said energized state whereby activation of adjoining segments causes the illumination thereof to blend together to optically present a single line in which individual segments are indistinguishable and in which said sequential activation and cumulative retention causes said line to appear to incrementally grow in length, release means for said retaining means effective to deactivate the said cumulatively retained emphasis means, and reset means triggerable at the end of said teaching sequence for activating said release means.

8. Apparatus for teaching a sequence of responses comprising the apparatus set forth in claim 7 wherein said screen is a rear projection screen and segmentalized line is mounted on the rear thereof.

9. Apparatus for preparing a prerecorded program for use in the apparatus of claim 4, said program preparation apparatus comprising a console including character keys, a space bar, and a carriage return actuator all arranged in standard typewriter keyboard layout, A. a record media and a means for recording control signals thereon in response to the manipulation of said keys, space bar, and carriage return at a desired typewriting speed incorporating variations in the time intervals between character key manipulations which are independent of ultimate student response and are in accordance with the nature and relationship of the individual characters, B. said console including
   a. a plurality of parallel connected switching devices operatively coupled to respective ones of said character keys and
   b. switching means operatively coupled to said space bar,
   c. switching means operatively coupled to said carriage return actuator C. first, second, and third cueing signal generators, D. means including said switching devices for applying an output of said first cueing signal generator to said record media upon manipulation of one of said character keys, E. means including said switching means for applying an output of said second cueing signal generator to said record media upon manipulation of said space bar, and F. means including said switching means for applying of said third cueing signal generator to said record media upon manipulation of said carriage return actuator.

10. Apparatus for teaching a sequence of individual physical responses which are conceptually divided into identifiable groups, said apparatus comprising:

a display screen for initially displaying to a student the entirety of a sequence of instruction and means for maintaining display of said sequence in perceptible form throughout the teaching of said sequence, said sequence comprising a multiplicity of perceptible characters, each of said characters being indicative of physical responses to be solicited of said student, said sequence including identifiable groups of various numbers of said characters making up words and identifiable subgroups making up syllables, said display screen including energizable means for individually emphasizing each said character, means for simultaneously activating said emphasizing means associated with all characters within respective ones of said identifiable subgroups at respective points in time during maintenance of display of said sequence, means for retaining the activated emphasizing means in said activated state, release means for said retaining means effective to deactivate said retained emphasis means, control means independent of student response for progressively energizing said activating means of said subgroups as each group of responses is solicited at respective points in time occurring at intervals which vary in accordance with the number, nature, and relationship of the characters making up said subgroup and for triggering said release means to deactivate the emphasizing means of an entire group only after all subgroups of said entire group have been activated and retained, and means for changing said sequence.

* * * * *